United States Patent [19]

Sherman et al.

[11] 4,199,607

[45] Apr. 22, 1980

[54] PROCESS FOR CARBONATION OF AN AQUEOUS MEDIUM

[75] Inventors: John D. Sherman, Chappaqua; Jay R. Ronald, Upper Nyack, both of N.Y.

[73] Assignee: Union Carbide Corporation, New York, N.Y.

[21] Appl. No.: 925,201

[22] Filed: Jul. 17, 1978

Related U.S. Application Data

[62] Division of Ser. No. 742,062, Nov. 15, 1976, Pat. No. 4,123,390.

[51] Int. Cl.$^2$ .............................................. A23L 2/00
[52] U.S. Cl. ..................................... 426/477; 426/590
[58] Field of Search ................ 426/67, 590, 424, 477; 252/455 Z

[56] References Cited

U.S. PATENT DOCUMENTS

| | | | |
|---|---|---|---|
| 3,906,076 | 9/1975 | Goytisolo | 252/455 Z |
| 4,007,134 | 2/1977 | Liepa et al. | 426/67 |
| 4,110,255 | 8/1978 | Liepa et al. | 426/67 |

*Primary Examiner*—Raymond N. Jones
*Assistant Examiner*—Elizabeth A. Hatcher
*Attorney, Agent, or Firm*—Richard G. Miller

[57] ABSTRACT

Carbonation of an aqueous medium by using zeolite agglomerates in which the distribution of capillary pores is modified to enhance the number of pores in the diameter range of from 2 to 100 microns, thereby improving its ability to release adsorbed $CO_2$ into liquid media in a manner which favors both a high rate of desorption and a high degree of solubility of the desorbate gases in the liquid media.

1 Claim, No Drawings

PROCESS FOR CARBONATION OF AN AQUEOUS MEDIUM

This application is a division of our prior U.S. application Ser. No. 742,062 filed Nov. 15, 1976 now U.S. Pat. No. 4,123,390.

The present invention relates in general to adsorbent agglomerates suitable for use in introducing gases into liquid media, and more particularly to zeolitic molecular sieve agglomerates which when preloaded with carbon dioxide and immersed in an aqueous medium, release the $CO_2$ at a rapid rate in the form of small bubbles.

It is a well-established practice to utilize agglomerates of molecular sieve zeolites to adsorb and hold gaseous materials in sites or reaction zones in a non-reactive state until released by desorption using a more strongly adsorbed material. A specific application of this type is disclosed in U.S. Pat. No. 3,888,998 wherein carbon dioxide containing molecular sieves are used to impart carbonation to aqueous beverage compositions at the point of consumption. To accomplish that purpose it has been proposed to utilize a multiplicity of small molecular sieve agglomerates or to use a single relatively large agglomerate, usually in the shape of a disk. The use of a multiplicity of molecular sieve agglomerates can be disadvantageous in several respects, principally in requiring an envelopment means to contain the individual members during release of the carbon dioxide and as a means to remove them from the beverage composition after carbonation has been accomplished.

Whereas a single large agglomerated molecular sieve mass does not require an encasement means, it has been found that it is difficult to achieve a high rate of carbon dioxide evolution from these monolithic structures while at the same time attaining a high degree of carbonation efficiency. As is reported in French Pat. No. 2,261,978, when a solid disk of a clay bonded molecular sieve composition which contains an effective amount of $CO_2$ is placed in a liquid beverage environment, the pressure generated by the carbon dioxide release from the molecular sieve is often so extreme as to cause disintegration or destruction of the disk body. Previous attempts to ameliorate this problem by the addition of high strength (non-clay) binders, have resulted in the formation of an agglomerate having a $CO_2$ release rate unacceptably low either for ultimate carbonation levels or for length of the carbonation period, or both.

One means heretofore proposed to solve the problem of release rate of $CO_2$ from the molecular sieve monolith agglomerates is to control the surface area relative to the mass of agglomerates such that the surface area to mass ratio is within the range of about 4 $cm^2/g$. to about 200 $cm^2/g$., provided the agglomerate also contains at least 6 grams of molecular sieve crystals which comprise at least 40 weight-% of the overall weight. Typically this can be accomplished by forming an agglomerate to have a plurality of substantially parallel elongated channels extending from one surface of the agglomerate to the interior thereof with the longitudinal axis of the elongated channels substantially parallel to the axis of the vertical dimension of the agglomerate.

The improvement of $CO_2$ release properties attributable to this type of configuration modification is directly dependent upon the distance which any incremental volume of the agglomerate is from the exterior surface thereof. The greater the number of channels extending into the body the shorter the distance from any interior point to the exterior surface and, consequently, the shorter the theoretical diffusion path of any adsorbed $CO_2$ molecule from the zeolite to the aqueous medium to be carbonated. It is also apparent, however, that with increasing values of the surface area to mass ratio the agglomerate structure becomes increasingly and undesirably fragile.

We have now discovered that the size distribution of the macropores in agglomerates, consisting of zeolitic molecular sieve crystals alone or of mixtures of zeolite crystals with conventional binder materials, is not as broad as has heretofore been supposed. In ordinary agglomerates of zeolite crystals prepared by the usual methods in the art, it has been found that there exists no appreciable proportion of macropores having average diameters greater than about 1 micron. This is apparently an inherent result of the normal packing arrangement of particles having diameters of about 15 microns or less, such as is the case with essentially all synthetic zeolite crystals prepared hydrothermally, as well as all of the common binder materials such as clays, aluminas and the like. Using these findings we have provided an improved molecular sieve body which possesses ideal $CO_2$ release characteristics for use in preparing carbonated beverages at the point of consumption.

In accordance with the present invention there is provided a porous rigid agglomerated body comprising zeolitic molecular sieve crystals having average diameters of from about 0.5 to 15 microns, said molecular sieve crystals having pores large enough to adsorb carbon dioxide, being present in an amount of at least 6 grams and comprising at least 40 weight percent, in their activated state, of said body, said body having a piece density of at least 0.5 g./cm.$^3$, an effective thickness value of greater than 0.20 cm., and preferably greater than 0.30 cm., a total capillary pore volume of from 0.2 to 1.0 cc./gm. in the activated state of which from 4 to 75, preferably 15 to 50, percent thereof is created by macropores having average diameters of from 2 to 100 microns, preferably from 2 to 50 microns, and at least 10 percent thereof created by macropores having diameters less than 1 micron.

In the preferred embodiment the zeolite agglomerated bodies include a binder material for the zeolite crystals in an amount of from 5 to 60, preferably 10 to 25, weight percent of the overall composition in the activated state. The particular binder material employed is not a critical factor, but is preferably a refractory inorganic oxide having particle sizes less than 1 micron in diameter. The most common of these are the clay minerals such as kaolin, kaolinite, attapulgite, bentonite, sepiolite, polygarskite, montmorillonite, illite, chlorite, and plastic ball clays, silica, silica-alumina, alumina, magnesia, zirconia, titania, thoria, beryllia, asbestos, pumice, firebrick and diatomaceous earths. Organic resins such as melamines, alkyds, acrylics, and phenolics are also representative of the large number of suitable binder materials well known in the art.

As used herein and in the claims, the term effective thickness value, "t", is defined by the equation $$t = 2m/ds$$

wherein "d" is the piece density of the agglomerated body in g/cm.$^3$, "s" is the gross surface area of the body in cm.$^2$, and "m" is the mass of the body in grams. In the application of the equation, the gross surface area includes the wall area of internal voids in the body which communicate with the exterior of the body through conduits larger than capillary dimensions, but does not include the walls of capillary pores. As a corollary, any internal void which communicates with the exterior not at all or only through capillary pores, contributes to the piece density of the body. Internal voids whose wall areas are included as a portion of the gross surface area do not contribute to the piece density of the body.

The activated state of zeolite crystals and agglomerate bodies as used herein means the condition of dehydration resulting from heating in air at 450° C. for 1 hour.

Although it is essential, from the standpoint of adsorptive capacity for $CO_2$, to employ crystalline zeolitic molecular sieves in the present compositions, the particular species or mixture of species to be used is not a critical factor. A substantial number of naturally occurring zeolites are available and include chabazite, mordenite, erionite, clinoptilolite, gmelinite, phillipsite, analcime, harmotome, and offretite. A large number of synthetic species, many of which have no naturally occurring analogs are also available and include those designated as zeolites A, X, Y, D, T, W, F, ZK-4, ZSM-5, ZSM-12, Omega. A more complete listing of natural and synthetic zeolites suitable for use in forming the compositions of the present invention is set forth in Breck, D. W., *ZEOLITE MOLECULAR SIEVES: structure, chemistry, and use*, a Wiley-Interscience publication (1974) New York, N.Y. the entire contents of which are incorporated herein by reference. A concise listing appears in Table 4.26 thereof. As is well known, the weight percent carbon dioxide that can be loaded on a particular molecular sieve and to some extent the rate at which the $CO_2$ is desorbed therefrom by water is dependent on its crystal structure. Thus mixtures of various zeolite species and/or mixtures of various cationic forms of the same zeolite species can be employed to achieve different levels of final carbonation of the aqueous medium and also different rates of carbon dioxide release.

Also the composite bodies of this invention can contain optional substances which do not adversely affect the carbonation function or the pore size distribution thereof. Such optional substances include Texas talc or calcined talc which tends to decrease the amount of shrinkage of the composite during calcination, deflocculants such as sodium silicate, sodium hexametaphosphate, sodium tetra pyrophosphate, and coplasticizers such as guar gum.

A typical zeolite agglomerate of the prior art, formed by conventional methods such as extrusion, compaction, pressmolding and the like, and calcined to dehydrate and "set" the formed agglomerate, exhibits a capillary or macropore volume of generally in the range of 20 to 40 volume percent, essentially all of which is created by macropores or capillary pores having diameters of less than 1 micron. This is due to the initial particle size of the zeolite crystals, which are generally from 0.5 to 15 microns in diameter and, when binders such as clays are used, the characteristic size of the binder particles. As used herein the term "capillary pore volume" or "capillary space" is intended to denote a particular portion of the total space within the adsorbent composite body, as defined by E. Manegold in Kolloik Z, 80,253 (1937). In accordance with that reference definition the total internal void space of an adsorbent body is divided into three parts: empty space, capillary space and force space. If the width of the space is so great that the forces emanating from the body material influence only a negligivly small portion of the matter which fills it, it is called "empty", "force-free", space. If the width of the space is so small that the forces originating from the adsorbent influence most of the matter within it, it is called "capillary" space. Lastly the space between the atoms of the adsorbent, including the internal pore volume of the zeolite crystals, constitute force space. Assuming a generally tubular configuration for the capillary pores of the compositions of the present invention, such pores will have diameters ranging from about 0.0035 to 1000 microns.

While we do not wish to be bound by any particular theory, it appears that the improved carbonation function of the compositions of the present invention is, in part at least, attributable to the fact that the pores larger than 1 micron serve a different function from those less than 1 micron. At the time the $CO_2$-loaded composite body is contacted with water to begin the carbonation process, there is the potential for an immediate competition between the inflow of water and the outflow of $CO_2$ through the capillary pores. In prior known zeolite-clay agglomerates in which most of the capillary pores are less than 1 micron in diameter, all capillary pores tend equally to draw in water by capillary action (wicking affect). Accordingly $CO_2$ liberated by desorption from the zeolite crystals must ultimately escape from the composite body principally by first attaining a sufficient pressure to force water out from some of such capillaries. Observations of $CO_2$-loaded disc composites of the prior art type removed from a water medium after about 2 minutes and broken open reveal that the centers are still dry and that the further penetration of the water is resisted by the back pressure of the trapped $CO_2$ gas. Some discs actually have been observed to explode violently after a short period of immersion, indicating a high pressure has been built up in the composites.

In the present composite bodies, however, the larger capillary pores, particularly those having diameters greater than about 2 microns, have capillary pressure drop values across a water meniscus therein several times less than for the smaller capillaries, i.e., those less than 1 micron. For water at 25° C., and assuming it perfectly wets the walls of a pore (assumed to be smooth walled cylinders) the surface tension $\gamma$ is 72 ergs/cm$^2$ and the contact angle, $\theta$ is zero. Thus the application of the pressure drop equation $$\Delta P = \gamma 2 \cos \theta / R$$

where in $\Delta P$ is the pressure difference across the meniscus and R is the pore radius, it is seen that for a 1.0 diameter pore, $\Delta P = 42$ psi, and for a 0.5 micro diameter pore, $\Delta P = 84$ psi. In the same manner it is determined that pores from 10 to 100 microns in diameter cause pressure drops to be reduced to the 0.4 to 4.2 psi range. Thus these pores can provide low resistance paths for $CO_2$ desorbed from the zeolite crystals to excape to the surface of the composite body, and still are small enough to generate the desired small bubbles. Consequently, the small pores through which water is passed into the center of the composite are relatively free of $CO_2$ back pressure, and higher carbon dioxide release rates are obtained using the bodies of the present invention compared to those of the prior art of the same size. Accordingly, the external surface area to mass ratio of the present agglomerate bodies can be substantially lower than would be necessary in prior known agglomerates providing equal carbonation performance. This permits the formation of less complex and stronger body configurations. Also simpler body configurations tend less to coalesce small emerging $CO_2$ bubbles into bubbles too larhe for effective carbonation of the aqueous medium.

The composite bodies of the present invention are readily prepared by incorporating into the zeolite composition, prior to shaping and firing thereof, fibers of a material which is thermally decomposable below the crystal destruction temperature of the zeolite and which leaves essentially no solid residue of decomposition. Fibers of such diverse substances as polyethylene, wool, horsehair, hemp, flax and oatmeal are suitably employed, but cellulosic fibers, particularly wood fibers, are especially preferred. Cellulosic fibers as a general class, i.e., those derived from cotton and wood sawdust and the like have diameters in the range of 10 to 30 microns and are readily available in lengths sufficient to create porous networks in even the largest composite bodies, i.e., those containing 150 or more grams of zeolite. The nearly ubiquitous and inexpensive substance, wood sawdust, is an ideal source of cellulosic fibers for use in the present compositions, and is particularly preferred. If before body compaction, the sawdust particles are mulled along with the clay and zeolite crystals, the large particles readily defibrillate into single fibers or packets of fibers having diameters of from about 10 to 30 microns. Although some shrinkage of the space in the composite initially occupied by the fibers occurs during the firing of the composite, routine experimentation readily reveals optimum degrees of mulling for any particular fiber source and zeolite agglomerate composition.

The manner in which the zeolite agglomerates of this invention are formed and fired are not critical factors. In those cases in which the thermally decomposable fibers to be incorporated have diameters of about 2 to 100 microns, it is only necessary to admix the fibers, the zeolite crystals and the binder material, if any, that is to be included, and form the agglomerates into the desired shape. With certain binder materials, particularly clays, it is common to admix enough water with the other ingredients to render the composition pliant or plastic-like in order to form a desired shape having sufficient green strength to permit handling prior to the firing step. In one method for preparing clay-bonded zeolite agglomerates in accordance with the present invention, a clay binder is made into a slurry with water. About 0.5 percent by weight of a clay dispersant has been found to aid in the preparation of the slurry. Another water slurry containing the molecular sieve crystals and the thermally decomposable fibers, of the desired final size is prepared. The resulting slurry is filtered and the filter cake dried to about 40 percent water content. This semi-plastic mass is then kneaded and shaped into the configuration of the final product. Thereafter the composite bodies are fired in air at a temperature sufficient to thermally destroy the decomposable fibers incorporated therein and to activate the zeolite by driving off the water of hydration of the crystals. Best results are obtained if the temperature is high enough to cause an irreversible phase change in the clay. For example, kaolinitic clays passes through an irreversible phase change between about 525° C. to about 575° C. This provides a product having maximum strength and attrition resistance. In carrying out this mode of operation care should be taken to select zeolite species having sufficient thermal and hydrothermal stability to withstand the firing conditions.

Another procedure suitably employed comprises mixing in a muller-mixer clay in pellet or powder form with zeolite powder and the thermally decomposable fibers, either of the desired final size or in the form of larger sized composites thereof, such as sawdust, woodchips and the like. A muller-mixer, also called a pan mixer, putty chaser, or edge runner, has one or more wheels (mullers) rolling around in a pan. Rotating scraper blades or plows continuously push material under the wheels and thus the muller-mixer combines kneading, grinding and mixing action to achieve very intimate mixing. The operation is particularly useful in reducing the size of aggregates of the thermally decomposable fiber material when such materials as saw dust are used as the source of the fibers. In the muller-mixer, the ingredients are partially wet and the mixer allowed to mull until plastic and suitable for shaping. The shaped composite bodies are then made, dried and fired to decompose the fibers and activate the zeolite as discussed hereinbefore.

The invention is illustrated by reference to the following examples:

EXAMPLE I (A) Zeolite agglomerated bodies of the present invention were prepared as follows: 850 grams of sodium zeolite Y, 150 grams of a montmorillonite type clay and 150 grams of wood sawdust (particle size 20×30 U.S. standard mesh) were placed in a muller and dry-mulled for 15 minutes. Thereafter 850 ml. of water was added and the mulling continued for 1 hour. The resulting plastic composition was then extruded through a circular die having a 1.75 inch diameter. The cylindrical extrudate was then sliced normal to its longitudinal axis into discs 0.37 inch thick. The discs were dried in an air oven at 100° C. and then activated (dehydrated) by further heating in air at 675° C. for 1 hour. While still hot and fully activated, the agglomerate discs were placed in a $CO_2$-purged container under an atmosphere of $CO_2$ maintained at a pressure of 760 mm. Hg during the period the disc cooled to room temperature while becoming loaded with $CO_2$.

(B) For purposes of comparison, the procedure of part (A) supra was repeated except that no wood sawdust particles were included in the formulation. The discs were 0.55 inch thick.

(C) Some of the discs prepared in parts (A) and (B) supra were examined by mercury porosimetry.

The pore volume and diameter range distribution in each of the discs was determined using conventional mercury porosimetry techniques. The following results were obtained:

| Sample | Pore diameter range (microns) | Pore Volume (cc./g.) of indicated pore diameter range |
|---|---|---|
| A | 0.0035–1.0 | 0.489 |
|   | 1.0–2.0 | 0.029 |
|   | 2.0–100 | 0.185 |
| B | 0.0035–1.0 | 0.319 |
|   | 1.0–2.0 | 0.001 |
|   | 2.0–100 | 0.007 |

(D) A comparison of the efficacy of each of the CO$_2$-loaded discs of parts (A) and (B) supra in carbonating an aqueous medium of a commercially available beverage concentrate was made in the following manner:

A solution of a sugar-based cola-flavored commercial concentrate was prepared by admixing 5 parts by volume of water and 1 part by volume of the said concentrate and cooling the resulting solution to about 4° C. in an ice water bath. The CO$_2$-loaded disc from part (A) was placed in a glass container open to the atmosphere and a volume of the cold cola solution equivalent to one U.S. fluid ounce per each 1.5 grams of the CO$_2$-loaded disc was rapidly poured into the container and onto the disc. Carbon dioxide immediately began desorbing from the zeolite adsorbent and bubbled through the cola solution. With the disc retained below the surface of the solution level, carbonation was permitted to continue for 4 minutes. At one minute into the carbonation step, a 5 ml. sample of the solution was removed from the container and at the end of 4 minutes of carbonation an additional 5 ml. sample was removed. Analysis of each of the samples established that after 1 minute, the disc has imparted 1.11 cc. [standard temperature and pressure, (STP)] dissolved CO$_2$ per ml. of cola solution. After 4 minutes, the carbon dioxide dissolved in the solution was 1.15 cc., STP per ml. of solution. The same testing procedure was carried out using the disc of part (B) supra except that the quantity of cola solution carbonated was equivalent to one U.S. fluid ounce per 1.9 grams of CO$_2$-loaded disc. Even though a larger weight of CO$_2$-loaded disc per fluid ounce of solution was used, it was found that the disc B not having the wide macropore distribution of the discs A of this invention was able to impart only 0.21 cc. (STP) of CO$_2$ per ml. of solution after 1 minute of the carbonation procedure, and only 0.55 cc. (STP) of CO$_2$ per ml. after 4 minutes of carbonation. The discs involved in the comparison tests had the following characteristics:

|  | disc A | disc B |
| --- | --- | --- |
| Effective thickness | 0.66 cm. | 0.86 cm. |
| activated weight | 10.6 | 20.9 |
| piece density | 0.73 g/cc | 0.96 g/cc |
| actual thickness | 0.37 inch | 0.55 inch |

EXAMPLE II

A carbonation efficiency comparison was made between two zeolite agglomerates prepared in disc form by tabletting rather than extrusion as in Example I. In the preparative procedure bentonite clay and a faujasite-type zeolite were admixed in weight proportions of 1:4 and wood sawdust particles (20×100 mesh) were added to a half portion of the zeolite clay mixture in an amount equal to ¾ of the clay content by weight. Each half portion after dry mulling for 10 minutes was further mulled with added water and lightly dried to form a friable cake. The dried mull cake was then broken into particles to pass No. 12 U.S. sieve and these particles disc-formed using a cylindrical die 2.55 inches in diameter, and a load of 20 tons applied for 2 seconds. The discs were dried at 100° C. and fired in air at 675° C. for 1 hour. This was sufficient to burn out the wood fibers from the one disc and activate both discs. Each was loaded with about 20 weight-% CO$_2$ and tested for carbonation efficiency using a test solution of 10 wt.-% sucrose in water as set forth in Example I (D). In each case the quantity of test solution was equivalent to one U.S. fluid ounce per 1.92 grams of CO$_2$-loaded disc. It was found that the disc prepared using the wood fibers had a pore volume distribution, as measured by mercury porosimetry, much broader than the comparison sample disc formed without wood fibers. The distribution is shown below:

| Sample | Pore diameter range (microns) | Pore Volume (cc./g.) of indicated pore diameter range |
| --- | --- | --- |
| Made Using Wood Fibers | 0.0035–1.0 | 0.331 |
|  | 1.0–2.0 | 0.047 |
|  | 2.0–100 | 0.135 |
| Made Without Wood Fibers | 0.0035–1.0 | 0.301 |
|  | 1.0–2.0 | 0.001 |
|  | 2.0–100 | 0.003 |

The disc of this invention having the large pore volume distribution was capable of imparting more than 0.92 cc. (STP) CO$_2$ per ml. of sucrose solution after 1 minute of carbonation time and 1.23 cc. (STP) CO$_2$ per ml. sucrose solution after 4 minutes of carbonation time. The corresponding values for the comparison disc were 0.54 cc./ml. and 0.99 cc./ml. respectively. The discs also had the following characteristics:

|  | Disc made with fibers | Disc made without fibers |
| --- | --- | --- |
| activated weight | 19.5 g. | 19.5 g |
| piece density | 0.78 g/cc. | 1.0 g/cc. |
| thickness | 0.30 inch | 0.23 inch |
| effective thickness | 0.61 cm. | 0.50 cm. |

What is claimed is:

1. Process for introducing carbon dioxide into an aqueous medium which comprises contacting said medium with a rigid porous agglomerated body comprising zeolite molecular sieve crystals having average diameters of from 0.5 to 15 microns and having pores large enough to adsorb carbon dioxide, said molecular sieve crystals being present in an amount of at least 6 grams and comprising at least 40 weight percent, in their activated state, of said body, said body having a piece density of at least 0.5 g./cm.$^3$, an effective thickness value of greater than 0.20 cm., a total capillary pore volume of from 0.2 to 1.0 cc./gm. in the activated state, of which from 4 to 75 percent thereof is created by macropores having average diameters of from 2 to 100 microns, and at least 10 percent thereof being created by macropores having diameters less than 1 micron, said body containing carbon dioxide adsorbed in the zeolitic molecular sieve crystals thereof, whereby the carbon dioxide is adsorbed by water from the aqueous medium.

* * * * *

UNITED STATES PATENT AND TRADEMARK OFFICE
CERTIFICATE OF CORRECTION

PATENT NO. : 4,199,607
DATED : April 22, 1980
INVENTOR(S) : John D. Sherman and Ronald J. Ross It is certified that error appears in the above—identified patent and that said Letters Patent are hereby corrected as shown below:

The co-inventor's name appearing as Jay R. Ronald should read Ronald J. Ross

Signed and Sealed this

Twenty-ninth Day of July 1980

[SEAL]

Attest:

SIDNEY A. DIAMOND

Attesting Officer  Commissioner of Patents and Trademarks